Figure 1:
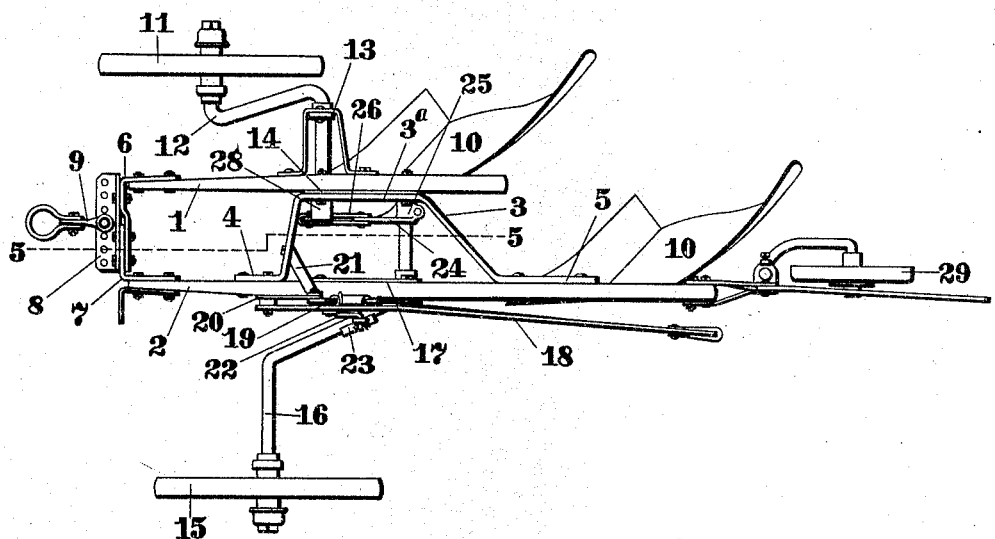

C. G. STRANDLUND.
WHEELED PLOW.
APPLICATION FILED JAN. 15, 1915.

1,237,407.

Patented Aug. 21, 1917.
2 SHEETS—SHEET 1.

Witnesses:
Martin Peterson
W. G. Duffield

Inventor:
Carl G. Strandlund
by W. C. Johnston
his Attorney

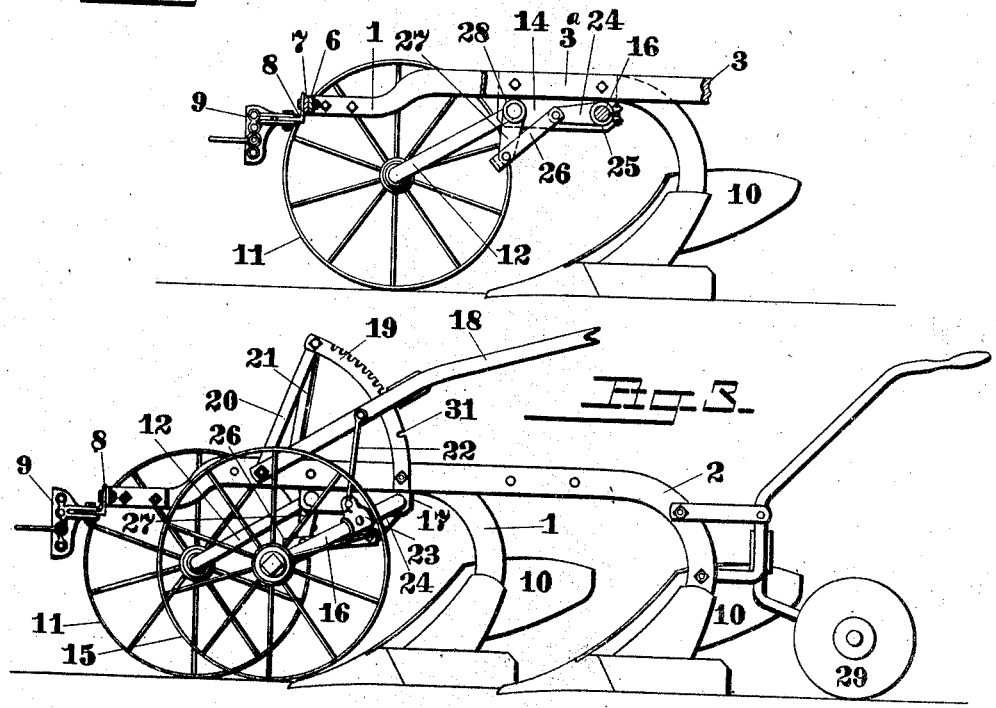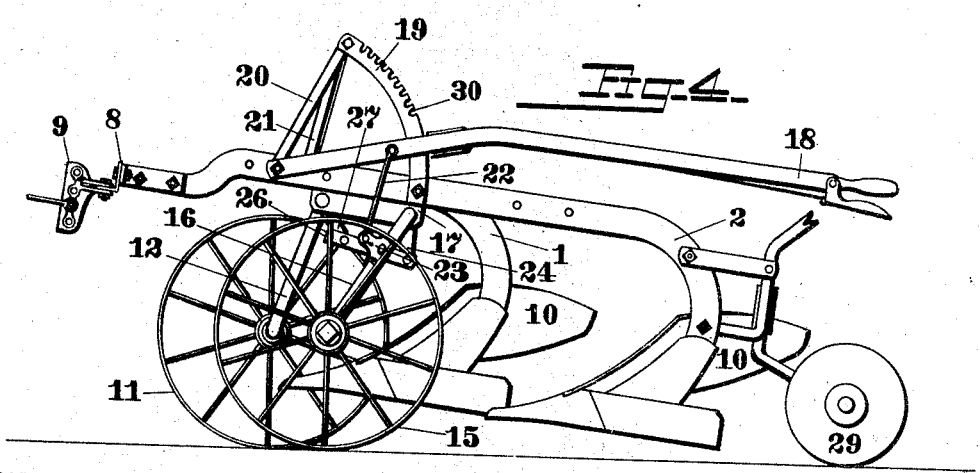

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

WHEELED PLOW.

1,237,407.  Specification of Letters Patent.  Patented Aug. 21, 1917.

Application filed January 15, 1915. Serial No. 2,344.

*To all whom it may concern:*

Be it known that I, CARL G. STRANDLUND, a citizen of the United States, residing at Moline, in the county of Rock Island and State of Illinois, have invented certain new and useful Improvements in Wheeled Plows, of which the following is a specification, reference being had therein to the accompanying drawing.

My invention relates to improvements in plows, particularly to that class known as wheel or sulky plows in which the supporting wheels are carried on crank-axles journaled on the plow-beams.

The object of my invention is to provide a single means for gaging the depth at which it is desired the plow should operate, and for lifting the plow out of operation and leveling the land and furrow wheels at the same time.

Figure 2:
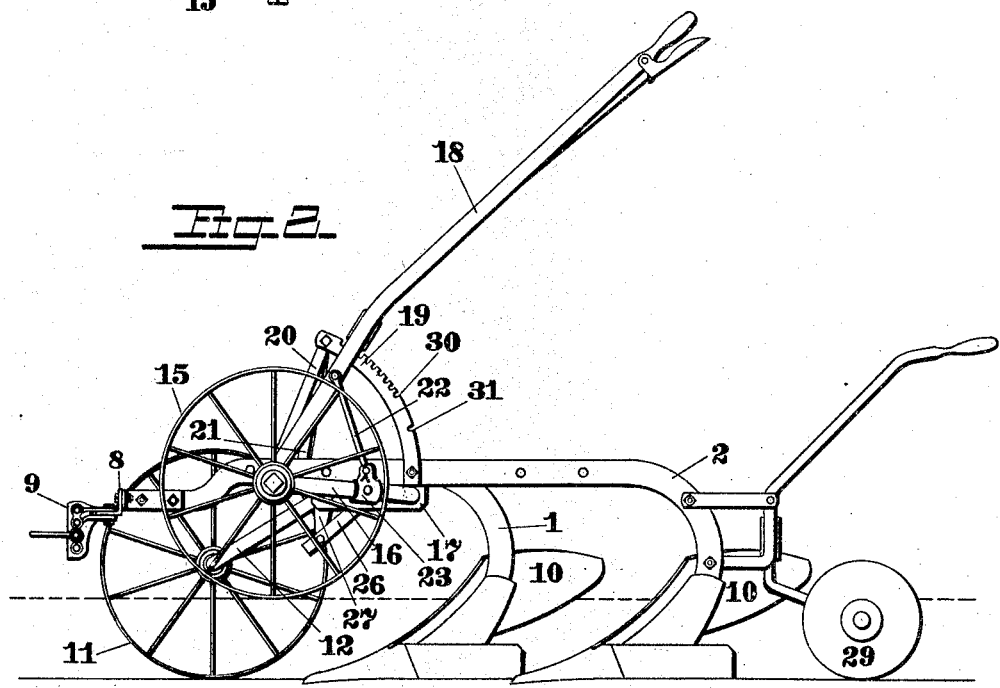

Referring to the drawings in which similar numerals indicate identical parts,

Figure 1 is a plan view of a two beam wheeled plow embodying my improvements. Fig. 2 is a side elevation showing the plow in position for operation at approximately a maximum depth. Fig. 3 shows in part the plow raised to the surface. Fig. 4 shows in part the plow in position for transportation, and Fig. 5 is a detail section on the line 5—5 of Fig. 1.

The plow-beams 1 and 2 are of a well known type and are rigidly secured together by a brace 3 having a central portion 3ª bolted to one of the plow-beams and extended at an angle to the other plow-beam and having the ends 4 and 5 bent in parallelism to the portion 3ª and rigidly secured to the second plow-beam, the plow-beams and connected bracing constituting the frame upon which my improvements are supported. The front ends of the plow-beams 1 and 2 are connected by laterally extending bars 6, 7, which are bolted together and to the plow-beams 1 and 2, and support a draft plate 8 to which is connected a clevis 9. Earth turning members 10 constituting part of the plow are secured to each beam.

The furrow-wheel 11 is journaled on the lower horizontal end of a crank-axle 12 having a rearwardly and upwardly inclined portion extending to the upper end of the crank-axle which is horizontal and parallel with the lower end; the upper end of the crank-axle 12 is supported in a bearing on a bracket 13, secured to the beam 1, and in a bearing on a plate 14 extending below the beam 1 to which it is secured preferably between the beam 1 and the central horizontal portion 3ª of the brace 3. The landwheel 15 is journaled on the lower horizontal end of a crank-axle 16 which has a rearwardly and upwardly inclined portion terminating in a horizontal portion supported in a suitable bearing in a plate 17, extending below the beam 2 and secured thereto, and also in a bearing in the plate 14.

An upwardly and rearwardly inclined hand lever 18 is pivoted on the plow-beam 2, and is provided with the usual latch to engage with anyone of a series of notches in a quadrant 19 secured to the beam 2. The upper end of the quadrant 19 is supported by a brace 20 secured thereto and to the beam 2, and by a brace 21 secured to the upper end of the quadrant 19 and to the forward portion of the brace 3. A link 22 is connected to the lever 18 and to a casting 23 secured to the inclined portion of the crank-axle 16. An arm 24, preferably integral with a sleeve 25 rigidly secured on the upper horizontal end of the crank-axle 16, extends forwardly to connection with a link 26 which in turn is connected to a downwardly extending arm 27, the latter being integral preferably with a sleeve 28 rigidly secured on the upper horizontal end of the crank-axle 12. The rear of the plow is supported by a rear furrow-wheel 29 suitably connected to the beam 2.

As shown in Fig. 2 the plow is in position for deep plowing, the ground line being indicated by the dotted line, the land-wheel 15 resting upon the unplowed ground, and the furrow-wheel 11 in the bottom of the preceding furrow, the hand lever 18 being at the limit of its upward movement, and the arms 24 and 27 and connecting link 26 being in the position shown in Fig. 5, the plow remaining level at all times. Adjustment of the plow to operate at different and shallower depths is effected by moving the lever 18 downward on the quadrant 19, and as the lever 18 is connected to the crank-axle 16 by the link 22 the land-wheel 15 is lowered raising the plow to the required depth for shallow cultivation, the limit of the downward movement of the lever 18 however raises the plow just to the surface of the ground. The downward movement of the lever as far as the notch 30 has substantially no effect upon the furrow-wheel 11, the joint of the arm 24 with the link 26 being practically the same distance below a line drawn from the point of connection of the link 26 and the center of the upper horizontal portion of the crank axle 16 as it is above said line when the lever 18 is at the limit of its upward movement on the quadrant 19. When the lever 18 is at the notch 30 the plow is just at the surface of the ground and the parts are as illustrated in Fig. 3 and in dotted lines in Fig. 5.

To raise the plow for transportation, the lever 18 is moved downwardly from the notch 30 to a notch 31 in the quadrant 19; during this movement the arm 24 is rocked downwardly by the upper horizontal end of the crank axle 16, to which it is rigidly secured, actuating the arm 27 through connection therewith by the link 26, and the latter is rigidly secured to the upper horizontal portion of the crank-axle 12, the crank axle 12 is operated to swing downwardly and rearwardly simultaneous with the similar movement of the crank-axle 16, so that both supporting wheels 11 and 15 are brought to the same horizontal plane and the plow is raised from the ground as shown in Fig. 4.

What I claim is—

In a wheeled plow, the combination of a frame, land and furrow wheels supported on forwardly extending crank-axles journaled on the frame, a lever pivoted on the frame forward of the axles, a link connected to said lever above the pivot thereof and to the land wheel crank axle, a forwardly projecting arm rigidly secured on the land wheel crank-axle, a downwardly extending arm rigidly secured on the furrow-wheel crank axle, and a link connecting one of said arms with the other.

In testimony whereof I affix my signature, in presence of a witness.

CARL G. STRANDLUND.

Witness:
JESSIE SIMSER.

Copies of this patent may be obtained for five cents each, by addressing the "Commissioner of Patents, Washington, D. C."